US011611416B2

(12) United States Patent
Hao et al.

(10) Patent No.: US 11,611,416 B2
(45) Date of Patent: Mar. 21, 2023

(54) RATE SPLITTING USING FIRST LAYERS AND SECOND LAYERS

(71) Applicant: QUALCOMM Incorporated, San Diego, CA (US)

(72) Inventors: Chenxi Hao, Beijing (CN); Yu Zhang, Beijing (CN); Chao Wei, Beijing (CN); Liangming Wu, Beijing (CN); Qiaoyu Li, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 15/733,764

(22) PCT Filed: Apr. 17, 2019

(86) PCT No.: PCT/CN2019/082972
§ 371 (c)(1),
(2) Date: Oct. 19, 2020

(87) PCT Pub. No.: WO2019/201262
PCT Pub. Date: Oct. 24, 2019

(65) Prior Publication Data
US 2021/0211249 A1  Jul. 8, 2021

(30) Foreign Application Priority Data

Apr. 20, 2018 (WO) ............... PCT/CN2018/083886

(51) Int. Cl.
H04L 5/00 (2006.01)

(52) U.S. Cl.
CPC .......... H04L 5/0042 (2013.01); H04L 5/0044 (2013.01)

(58) Field of Classification Search
None
See application file for complete search history.

(56) References Cited

U.S. PATENT DOCUMENTS

2010/0218067 A1* 8/2010 Kim ...................... H04L 1/0089
714/752
2014/0146756 A1  5/2014 Sahin et al.
(Continued)

FOREIGN PATENT DOCUMENTS

| CN | 107529202 A | 12/2017 |
| EP | 0993137 A1 | 4/2000 |
| EP | 3291628 A1 | 3/2018 |

OTHER PUBLICATIONS

Huawei et al., "Discussion on the design of SCMA", R1-1803663, 3GPP TSG RAN WG1 Meeting #92bis, Apr. 7, 2018 (Apr. 7, 2018), 7 Pages, section 3.
(Continued)

Primary Examiner — Diane L Lo
(74) Attorney, Agent, or Firm — Qualcomm Incorporated

(57) ABSTRACT

Various aspects of the present disclosure generally relate to wireless communication. In some aspects, a transmitter device may allocate data associated with a user equipment (UE), of two or more UEs, into at least one of a first part, a second part, or a combination thereof; multiplex the first part of the data associated with the UE with a first part of data associated with one or more other UEs, of the two or more UEs, to form multiplexed data; map the multiplexed data to a first set of layers; and map the second part of the data associated with the UE and a second part of the data associated with the one or more other UEs to a second set of layers. Numerous other aspects are provided.

30 Claims, 8 Drawing Sheets

(56) References Cited

U.S. PATENT DOCUMENTS

| | | |
|---|---|---|
| 2017/0134150 A1 | 5/2017 | Hwang et al. |
| 2019/0044571 A1* | 2/2019 | Taherzadeh Boroujeni ................ H04B 1/707 |
| 2019/0173502 A1* | 6/2019 | Kimura ............... H04J 13/0003 |
| 2020/0213057 A1* | 7/2020 | Bala .................... H04L 27/2613 |

OTHER PUBLICATIONS

International Search Report and Written Opinion—PCT/CN2018/083886—ISA/EPO—dated Jan. 2, 2019.
International Search Report and Written Opinion—PCT/CN2019/082972—ISA/EPO—dated Jul. 10, 2019.
Qualcomm Incorporated: "On RLC Split for Inter-site Multi-point Transmission in HSDPA", 3GPP TSG RAN WG2 Meeting #76, R2-116059, Nov. 18, 2011 (Nov. 18, 2011), pp. 1-6.
Miao Y., et al., "Rate-Splitting Multiple Access for Downlink Communication Systems: Bridging, Generalizing and Outperforming SDMA and NOMA", arxiv.org, Cornell University Library, 201 OLIN library Cornell University Ithaca, NY 14853, Apr. 17, 2018, Oct. 30, 2017 (Oct. 30, 2017), XP081313481, 34 pages, paragraphs [0IVb], [0IVc], figure 2.
Supplementary European Search Report—EP19787615—Search Authority—The Hague—dated Dec. 8, 2021.
Clerckx B., et al., "Rate Splitting for MIMO Wireless Networks: A Promising PHY-Layer Strategy for LTE Evolution", IEEE Communications Magazine, vol. 54, No. 5, May 2016, pp. 98-105.

* cited by examiner

RATE SPLITTING USING FIRST LAYERS AND SECOND LAYERS

CROSS-REFERENCE TO RELATED APPLICATIONS

This application is a 371 national stage of PCT Application No. PCT/CN2019/082972 filed on Apr. 17, 2019, entitled "RATE SPLITTING USING FIRST LAYERS AND SECOND LAYERS," which claims priority to Patent Cooperation Treaty (PCT) Patent Application No. PCT/CN2018/083886, filed on Apr. 20, 2018, entitled "TECHNIQUES AND APPARATUSES FOR SIGNALING REGARDING RATE SPLITTING USING FIRST LAYERS AND SECOND LAYERS," which are hereby expressly incorporated by reference herein.

FIELD OF THE DISCLOSURE

Aspects of the present disclosure generally relate to wireless communication and to techniques and apparatuses for rate splitting using first layers and second layers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first receiver device, may include receiving a communication that includes a first set of layers for the first receiver device and a second receiver device, and extracting bits associated with at least one layer, of the first set of layers, to obtain data, wherein the data is associated with the first receiver device, and wherein a particular portion of total bits associated with the at least one layer of the first set of layers contains the data.

In some aspects, a first receiver device for wireless communication may include memory and one or more processors operatively coupled to the memory. The memory and the one or more processors may be configured to receive a communication that includes a first set of layers for the first receiver device and a second receiver device, and extract bits associated with at least one layer, of the first set of layers, to obtain data, wherein the data is associated with the first receiver device, and wherein a particular portion of total bits associated with the at least one layer of the first set of layers contains the data.

In some aspects, a non-transitory computer-readable medium may store one or more instructions for wireless communication. The one or more instructions, when executed by one or more processors of a first receiver device, may cause the one or more processors to receive a communication that includes a first set of layers for the first receiver device and a second receiver device, and extract bits associated with at least one layer, of the first set of layers, to obtain data, wherein the data is associated with the first receiver device, and wherein a particular portion of total bits associated with the at least one layer of the first set of layers contains the data.

In some aspects, an apparatus for wireless communication may include means for receiving a communication that includes a first set of layers for the apparatus and a receiver device; and means for extracting bits associated with at least one layer, of the first set of layers, to obtain data, wherein the data is associated with the apparatus, and wherein a particular portion of total bits associated with the at least one layer of the first set of layers contains the data.

In some aspects, a method of wireless communication, performed by a transmitter device, may include allocating data associated with a UE, of two or more UEs, into at least one of a first part, a second part, or a combination thereof; multiplexing the first part of the data associated with the UE with a first part of data associated with one or more other UEs, of the two or more UEs, to form multiplexed data; mapping the multiplexed data to a first set of layers; and mapping the second part of the data associated with the UE and a second part of data associated with the one or more other UEs to a second set of layers.

In some aspects, a transmitter device for wireless communication may include memory and one or more processors operatively coupled to the memory. The memory and the one or more processors may be configured to allocate data associated with a UE, of two or more UEs, into at least one of a first part, a second part, or a combination thereof; multiplex the first part of the data associated with the UE with a first part of data associated with one or more other UEs, of the two or more UEs, to form multiplexed data; map the multiplexed data to a first set of layers; and map the second part of the data associated with the UE and a second part of data associated with the one or more other UEs to a second set of layers.

In some aspects, a non-transitory computer-readable medium may store one or more instructions for wireless communication. The one or more instructions, when executed by one or more processors of a transmitter device, may cause the one or more processors to allocate data associated with a UE, of two or more UEs, into at least one of a first part, a second part, or a combination thereof; multiplex the first part of the data associated with the UE with a first part of data associated with one or more other UEs, of the two or more UEs, to form multiplexed data; map the multiplexed data to a first set of layers; and map the second part of the data associated with the UE and a second part of data associated with the one or more other UEs to a second set of layers.

In some aspects, an apparatus for wireless communication may include means for allocating data associated with a UE, of two or more UEs, into at least one of a first part, a second part, or a combination thereof; means for multiplexing the first part of the data associated with the UE with a first part of data associated with one or more other UEs, of the two or more UEs, to form multiplexed data; means for mapping the multiplexed data to a first set of layers; and means for mapping the second part of the data associated with the UE and a second part of data associated with the one or more other UEs to a second set of layers.

Aspects generally include a method, apparatus, system, computer program product, non-transitory computer-readable medium, user equipment, base station, transmitter device, receiver device, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology firstly associated with 3G and/or 4G wireless technologies, aspects of the present disclosure can be applied in other generation-based communication systems, such as 5G and later, including NR technologies.

Figure 1:
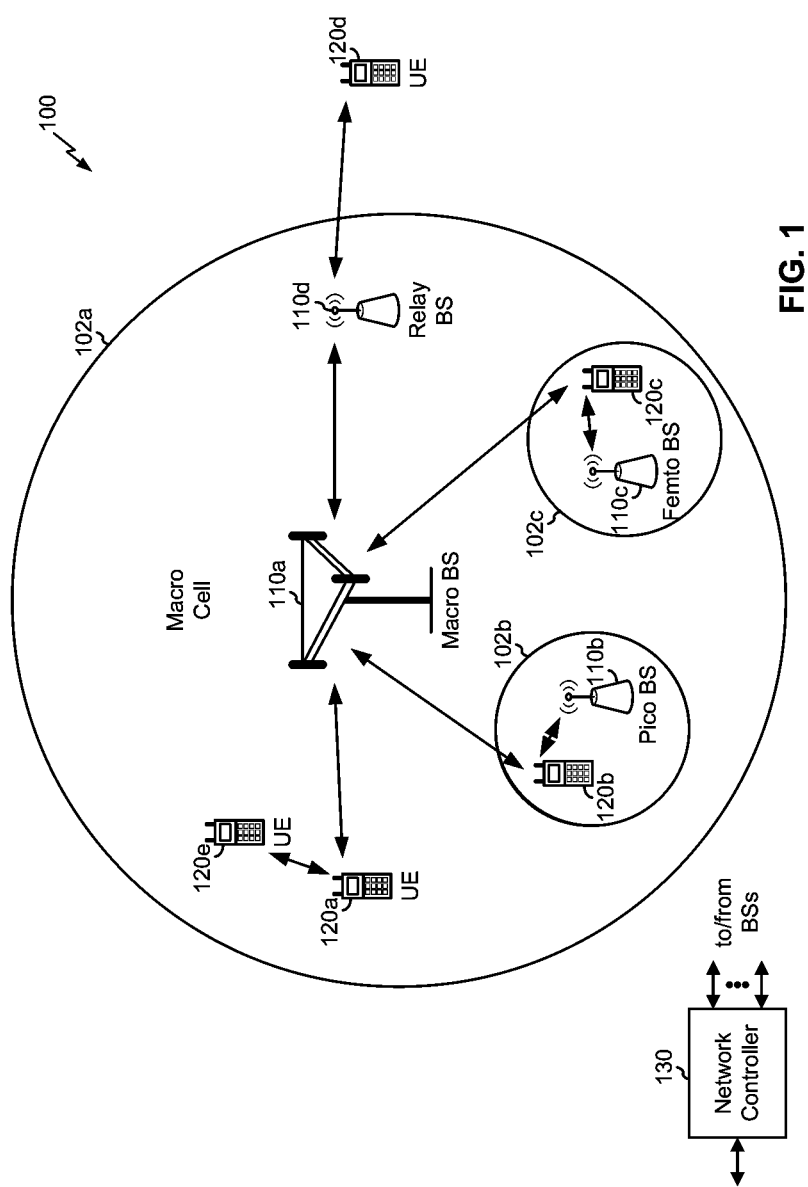
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a Global Positioning System device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided as an example. Other examples may differ from what is described with regard to FIG. 1.

Figure 2:
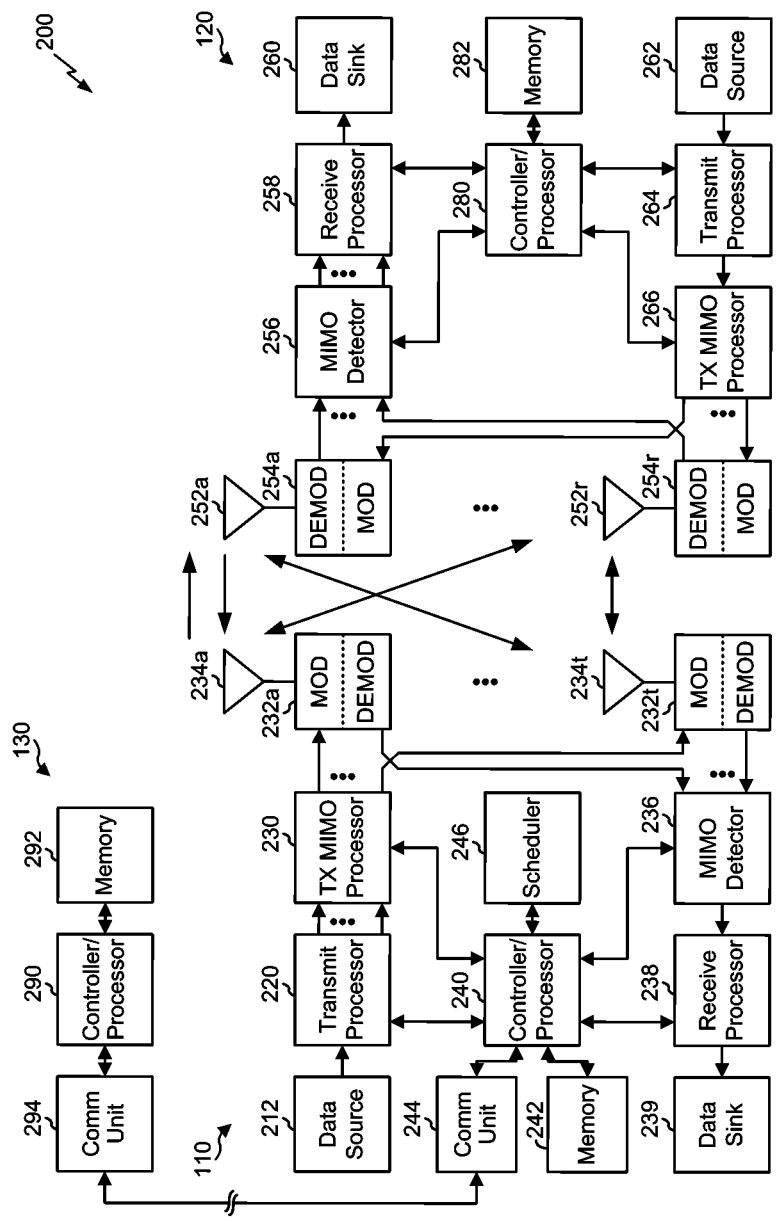
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292. In some aspects, one or more components of UE 120 may be included in a housing.

Controller/processor 240 of BS 110, controller/processor 280 of UE 120, and/or any other component(s) of FIG. 2 may perform one or more techniques associated with rate splitting using second layers and first layers, as described in more detail elsewhere herein. For example, controller/processor 240 of BS 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for BS 110 and UE 120, respectively. A scheduler 246 may schedule UEs for data transmission on the downlink and/or uplink.

In some aspects, a transmitter device (e.g., BS 110, UE 120, or a different device) may include means for allocating data associated with a user equipment (UE) (or any receiver device), of two or more UEs (e.g., two or more receiver devices), into at least one of a first part, a second part, or a combination thereof; means for multiplexing the first part of the data associated with the UE with a first part of data associated with one or more other UEs, of the two or more UEs, to form multiplexed data; means for mapping the multiplexed data to a first set of layers; means for mapping the second part of the data associated with the UE and a second part of data associated with the one or more other UEs to a second set of layers; means for providing information for the two or more UEs, indicating respective fractions of bits to be extracted from the composite bit sequence; means for providing information for the two or more UEs indicating respective fractions of bits to be extracted from a composite coded code block or a composite coded codeword; means for providing information indicating whether the multiplexing or the splitting is applied to at least one of uncoded codeblocks or codewords, transport blocks, or coded codeblocks or codewords; means for providing information indicating a mapping of the data associated with the one or more other UEs with regard to at least one of the first set of layers or the second set of layers; means for configuring one or more modulation constellations or coding schemes to be used for at least one of the first set of layers or the second set of layers; means for providing information associated with the first set of layers; and/or the like. In some aspects, such means may include one or more components of BS 110 or UE 120 described in connection with FIG. 2.

In some aspects, a first receiver device (e.g., BS 110 or UE 120) may include means for receiving a communication that includes a first set of layers for the first receiver device and a second receiver device; means for extracting bits associated with at least one layer of the first set of layers to obtain data, wherein the data is associated with the first receiver device, and wherein a particular portion of total bits associated with the at least one layer of the first set of layers contains the data; means for receiving a second set of layers associated with the first receiver device; means for obtaining other data associated with the first receiver device from at least one layer of the second set of layers; means for receiving information indicating whether the extracting is to be performed with regard to decoded bits or demodulated undecoded bits; means for selectively performing the extracting after channel decoding or before channel decoding based at least in part on the information; means for receiving information indicating a mapping of codewords or code blocks to at least one layer of the first set of layers and the second set of layers; means for receiving information identifying one or more modulation constellations to be used for at least one layer of the first set of layers and the second set of layers; means for demodulating constellation symbols associated with the at least one layer of the first set of layers and the second set of layers based at least in part on the information identifying the one or more modulation constellations; and/or the like. In some aspects, such means may include one or more components of BS 110 or UE 120 described in connection with FIG. 2.

As used herein, "bit" or "codeword" may refer to a coded code block, a coded codeword, an uncoded codeblock, or an uncoded codeword.

As indicated above, FIG. 2 is provided as an example. Other examples may differ from what is described with regard to FIG. 2.

Multi-user multiple-input multiple-output (MU-MIMO) can be used to transmit data to different UEs (e.g., UE 120) contemporaneously using at least partially overlapping frequency resources. For example, a transmitted signal may include a signal for a first UE, a signal for a second UE, and so on. In this scenario, each UE not only receives the desired signal, but also overhears signals intended to one or more other UEs on the same time-frequency resource. Since UEs may not be able to cooperate with each other, how to resolve the inter-user interference is an issue.

In some aspects, an MU-MIMO signal may be constructed to perform interference rejection at the transmitter (e.g., using zero-forcing beamforming or a similar technique). In such a case, performance may be ideal (e.g., improved, optimal, and/or the like) when channels for the recipients are orthogonal and the transmitter obtains (e.g., perfect) knowledge of the channel state information (CSI) of the recipients. In some aspects, a MU-MIMO signal may be constructed through superposition coding. In such a case, the data intended to each UE are transmitted using a common precoder and power levels of signals of the UEs may be different. The stronger UE (i.e., the UE with a higher channel gain) may decode the data intended to weaker UE(s), and then may decode the desired data of the stronger UE by cancelling the interference from the data intended to the weaker UEs. A weaker UE may decode the weaker UE's desired data by treating the inter-user interference as noise because the weaker UE may be incapable of decoding the inter-user interference. Superposition coding may provide ideal performance (e.g., improved, optimal, etc.) when the UEs are collocated (e.g., when the UEs are not separable in a spatial domain or there is a single antenna at the transmitter).

However, interference rejection at the transmitter may rely on high accuracy of CSI and spatial separation of the UEs to deliver adequate performance, and interference decoding at the UE may provide ideal performance only when UEs are spatially aligned. Furthermore, in the massive MIMO case, where there is a large number of antennas at the transmitter, UEs may be barely spatially aligned, so interference rejection by the transmitter may be preferred. However, obtaining accurate CSI at the transmitter (CSIT) may be an issue.

Some techniques and apparatuses described herein provide for data for UEs to be transmitted using at least one first part, transmitted without interference rejection (e.g., multicasting to multiple UEs), which each recipient UE is able to detect and decode, and at least one second part, transmitted via interference rejection, that only a corresponding UE is to decode. By jointly multicasting first parts and unicasting second parts via interference rejection (e.g., the first parts may be superimposed on top of the second parts, and the messages included in the first parts may be superposition coded), performance may be maintained for UEs irrespective of whether the UEs are collocated or spatially aligned. Thus, performance of MU-MIMO may be improved and throughput may be maintained irrespective of whether the UEs are collocated or spatially aligned.

FIGS. 3-6 are described with reference to a BS 110 and two or more UEs 120 (sometimes referred to as UE 1 and UE 2 for brevity). However, the processes and techniques described with regard to FIGS. 3-6 may be performed by any transmitter device (e.g., for FIGS. 3 and 5) and any receiver device (e.g., for FIGS. 4 and 6). For example, the transmitter device may include a BS 110, a UE 120, or another type of device. Similarly, the receiver device may include a BS 110, a UE 120, or another type of device.

Figure 3:
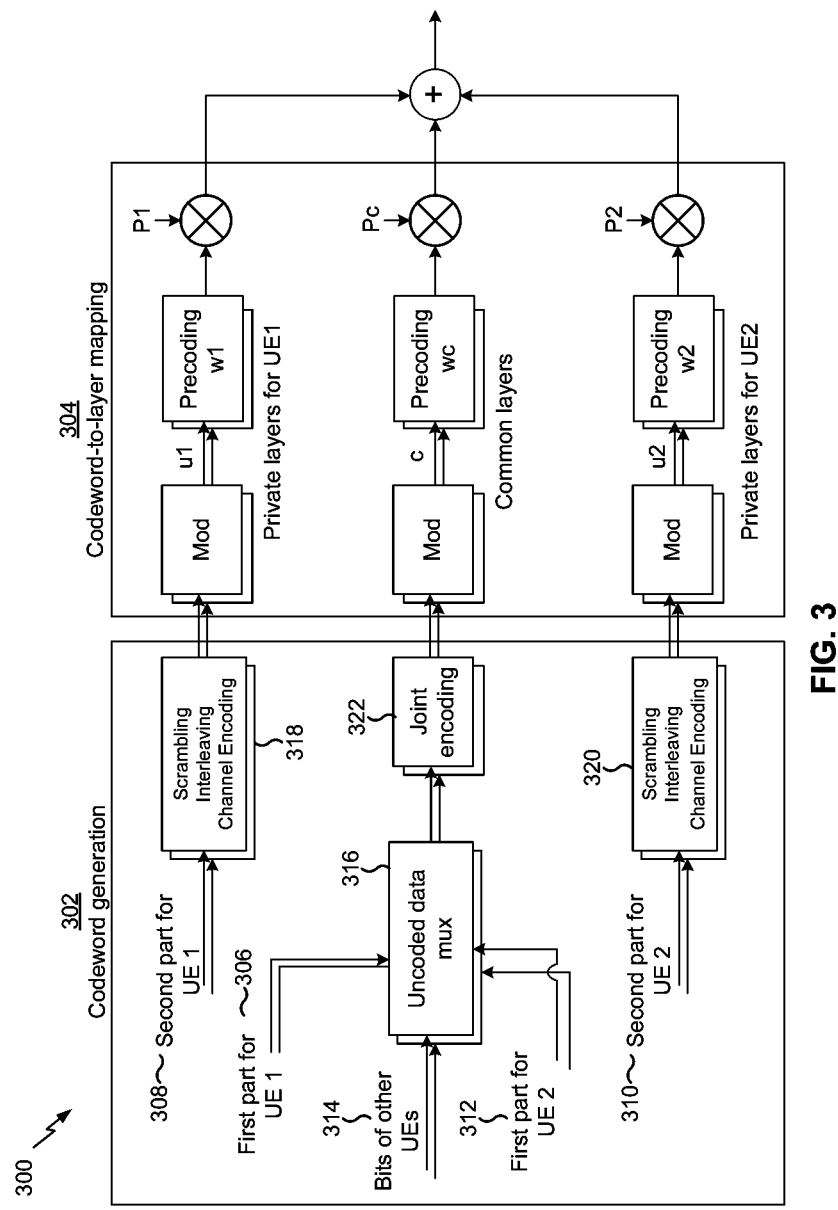
FIG. 3 is a diagram illustrating an example of a transmitter device for transmitting communications using at least one first layer and/or at least one second layer that are formed using uncoded bits, in accordance with various aspects of the present disclosure.

FIG. 3 is a diagram illustrating an example 300 of a transmitter device for transmitting communications using at least one first layer and/or at least one second layer that may be formed by multiplexing data of different UEs before channel coding, in accordance with various aspects of the present disclosure. The operations described in connection with FIG. 3 may be performed by a transmitter device (e.g., BS 110 or UE 120).

As shown in FIG. 3, and by reference number 302, the transmitter device may perform codeword generation operations to generate codewords to be mapped to layers (e.g., first layers and/or second layers). As shown by reference number 304, the transmitter device may perform codeword-to-layer mapping to map the codewords to first layers and/or second layers for transmission to a receiver device (e.g., BS 110 or UE 120).

As shown by reference number 306, the transmitter device may receive or generate a first part (e.g., a data stream, a part of a data stream, a codeword, a set of codewords, etc.) for a first UE (e.g., UE 1). For example, the first bits may include some or all of the second bits and/or may include information other than information included in the second bits. As shown by reference number 308, the transmitter device may receive or generate a second part (e.g., a data stream, a part of a data stream, a codeword, a set of codewords, and/or the like) for the first UE. As shown by reference number 310, the transmitter device may receive or generate a second part for a second UE (e.g., UE 2). As shown by reference number 312, the transmitter device may receive or generate data for a first part for the second UE. As shown by reference number 314, in some aspects, the transmitter may receive or generate data for UEs other than the first UE or the second UE (e.g., shown as "bits of other UEs").

As shown by reference number 316, the transmitter device may multiplex the first bits of UE 1, UE 2, and the other UEs (when present). For example, the transmitter device may multiplex the first bits to form a first part to be mapped to one or more first layers. The transmitter device may use any multiplexing scheme to multiplex the first bits (e.g., localized multiplexing, a comb-based multiplexing technique, and/or the like). In this case, the transmitter device multiplexes the first bits before the first bits are encoded to generate codewords.

As shown by reference number 318, the transmitter device may perform scrambling, interleaving, and/or channel encoding for the second part of the first UE. As shown by reference number 320, the transmitter device may perform scrambling, interleaving, and/or channel encoding for the second part of the second UE.

As shown by reference number 322, the transmitter device may perform joint channel encoding of the first parts of the UEs. As further shown, the transmitter device may perform codeword-to-layer mapping. The first parts are mapped to first layers, while the second parts are mapped to second layers. In some cases, a set of first layers may be referred to herein as a first set of layers, and a set of second layers may be referred to as a second set of layers. Afterwards, the transmitter device may perform precoding (e.g., using w1 for the second layer of UE 1, w2 for the second layer of UE 2, and wc for the first layer of the UEs), and may apply respective power levels (e.g., P1 for the second layer of UE 1, P2 for the second layer of UE 2, and Pc for the first layer of the UEs), as described above. Thus, the transmitter device enables joint unicasting of second parts and multicasting of first parts, thereby improving throughput and performance for collocated receiver devices. Furthermore, it can be seen that a second layer may be considered a private layer of a recipient device, and a first layer may be considered a common layer of multiple recipient devices.

As indicated above, FIG. 3 is provided as an example. Other examples may differ from what is described with respect to FIG. 3.

Figure 4:
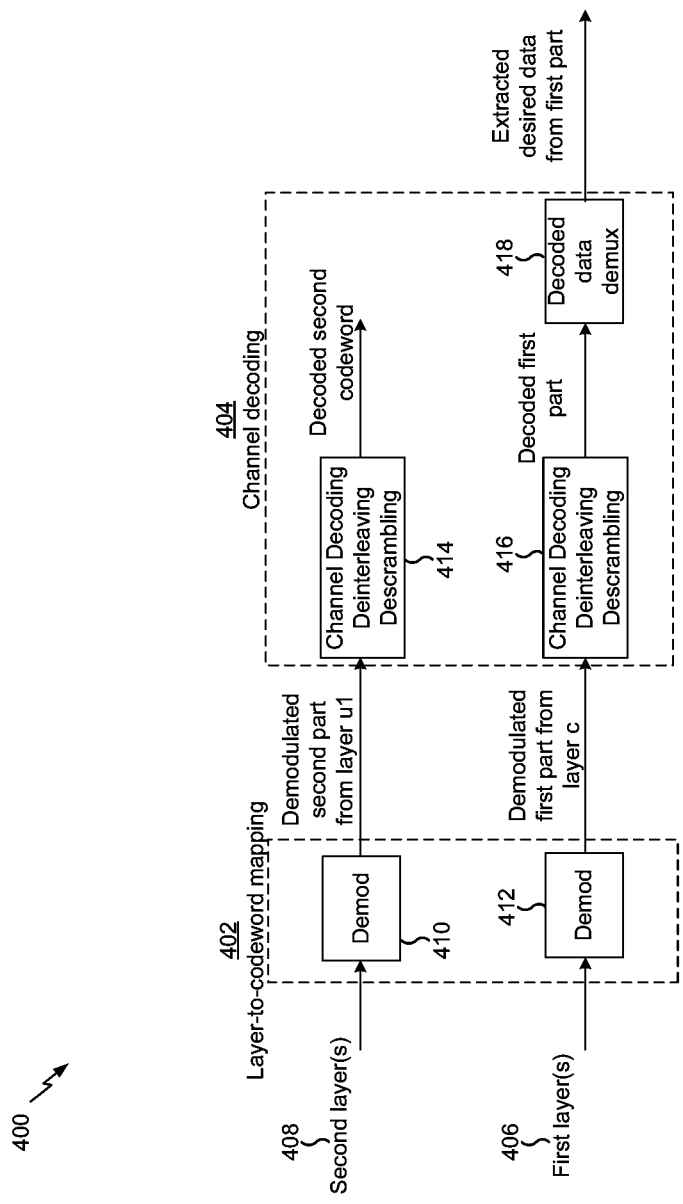
FIG. 4 is a diagram illustrating an example of a receiver device for receiving communications using at least one first layer and/or at least one second layer that are formed using uncoded bits, in accordance with various aspects of the present disclosure.

FIG. 4 is a diagram illustrating an example 400 of a receiver device for receiving communications using at least one second layer and/or at least one first layer that are formed by multiplexing data of different UEs before channel coding, in accordance with various aspects of the present disclosure. The receiver device described in connection with FIG. 4 may perform layer-to-codeword mapping (shown by reference number 402) and channel decoding (shown by reference number 404) based at least in part on one or more second layers and one or more first layers.

As shown by reference number 406, a receiver device may receive one or more first layers, and, as shown by reference number 408, the receiver device may receive one or more second layers. Here, the one or more second layers are associated with the receiver device. In some aspects, the receiver device may receive another second layer that is not associated with the receiver device (e.g., that is associated with another receiver device). In such a case, the receiver device may discard the other second layer, may perform interference detection to cancel the other second layer, and/or the like. Here, the one or more first layers include information associated with the receiver device and one or more other receiver devices.

As shown by reference number 410, the receiver device may demodulate the second layer to obtain desired data associated with the receiver device. As shown by reference number 412, the receiver device may demodulate the first layer to obtain data associated with the receiver device and the one or more other receiver devices. In some aspects, the receiver device may demodulate constellation symbols of the first layer and/or the second layer based at least in part on configuration information indicating a constellation (e.g., a modulation constellation) associated with the first layer and/or the second layer. For example, the configuration information may indicate constellations associated with all layers, a respective constellation associated with each layer, a constellation associated with a particular codeword or set of codewords, and/or the like. The receiver device may demodulate the constellation symbols of the second layer and/or the first layer based at least in part on the configuration information.

In some aspects, the receiver device may demodulate, decode, deinterleave, and/or descramble the first layer and/or the second layer based at least in part on information identifying a mapping of codewords to layers. For example, the information identifying the mapping may indicate whether the receiver device is to receive one or more first layers, may indicate which codewords are to be mapped to particular layers, may indicate a ratio or fraction of bits to be extracted from a first layer, and/or the like.

As shown by reference number 414, the receiver device may perform channel decoding, deinterleaving, and/or descrambling on the second part of the receiver device to obtain decoded second information of the receiver device. In this way, the receiver device obtains data provided to the receiver device via a second layer.

As shown by reference number 416, the receiver device may perform channel decoding, deinterleaving, and/or descrambling on the demodulated data provided via a first layer. For example, the receiver device may perform channel decoding to obtain decoded data provided via a first layer. The decoded data provided via the first layer may include codewords pertaining to multiple, different receiver devices. For example, a first part of a codeword may pertain to a first receiver device, and a second part of the codeword may pertain to a second receiver device. In some aspects, a first codeword of the decoded first part may pertain to a first receiver device and a second codeword of the decoded data may pertain to a second receiver device.

As shown by reference number 418, the receiver device may demultiplex the decoded data. For example, and as shown, the receiver device may extract desired data (e.g., data pertinent to the receiver device) from the decoded data. In some aspects, the receiver device may extract the desired data based at least in part on information identifying a fraction or ratio of bits of the codewords to be extracted. In some aspects, the fraction or ratio may be received from the transmitter device. In this way, the receiver device may extract desired data from the entire second layer, and may extract desired data, relevant to the receiver device, from a first layer based on the configured ratio or fraction. Thus, the performance of MIMO communication with the receiver device is improved irrespective of whether the receiver device is collocated or spatially separate from other receiver devices.

As indicated above, FIG. 4 is provided as an example. Other examples may differ from what is described with respect to FIG. 4.

Figure 5:
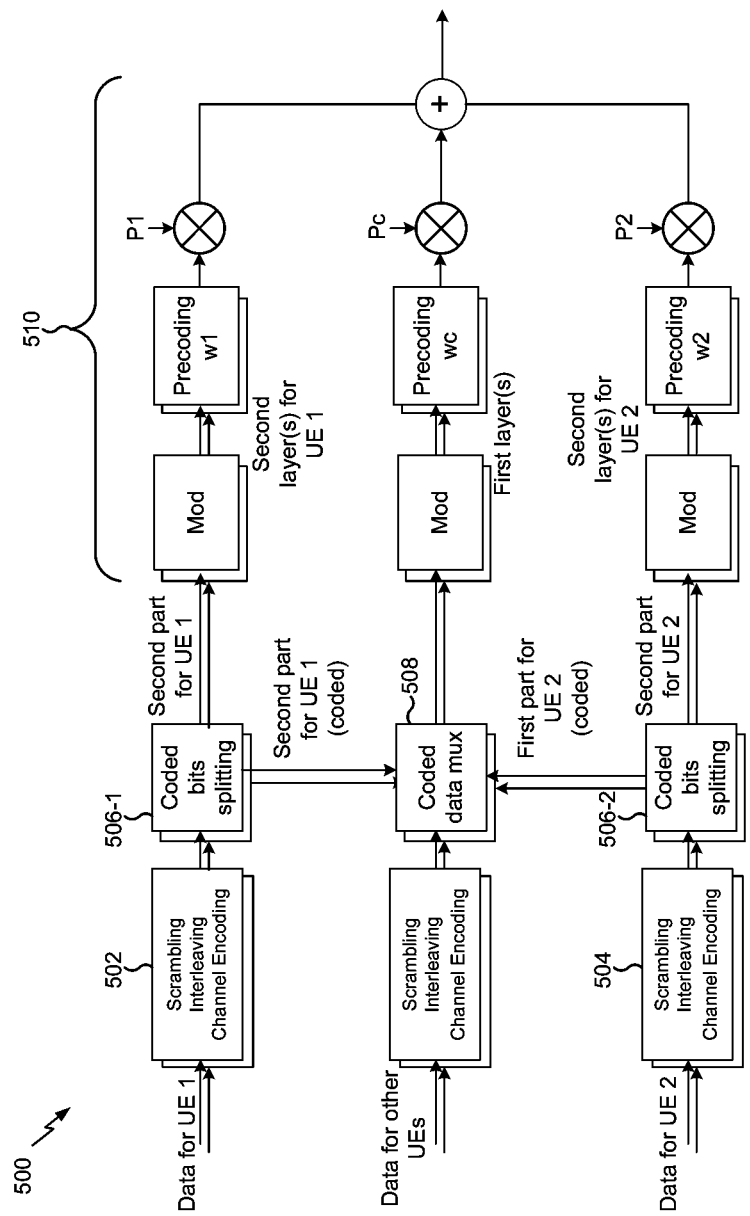
FIG. 5 is a diagram illustrating an example of a transmitter device for transmitting communications using at least one first layer and/or at least one second layer that are formed using coded bits, in accordance with various aspects of the present disclosure.

FIG. 5 is a diagram illustrating an example 500 of a transmitter device for transmitting communications using at least one first layer and/or at least one second layer that are formed using coded bits, in accordance with various aspects of the present disclosure. In some aspects, the operations described in FIG. 5 may be performed by a transmitter device (e.g., BS 110, UE 120, etc.).

As shown in FIG. 5, and by reference numbers 502 and 504, the transmitter device may receive or generate data for UE 1 and UE 2 (e.g., receiver devices). As further shown, the transmitter device may receive or generate data for one or more other UEs (e.g., one or more other receiver devices). In some aspects, the transmitter device may perform scrambling, interleaving, and/or channel coding to generate codewords or coded bits or coded data.

As shown by reference numbers 506-1 and 506-2, the transmitter device may perform rate splitting of the coded bits of the data for UE 1 and UE 2. For example, the data of UE1 and UE2 may be split into respective first parts and second parts, wherein the first parts of the data of UE1 and UE2 are multiplexed together. In some aspects, when first parts of other UEs are to be transmitted as well, the first parts of the other UEs and the first parts of UE 1 and UE 2 are multiplexed.

As shown by reference number 508, the transmitter device may multiplex the coded first part for UE 1, UE 2, and the other UEs (when present) to generate a first part for the first layer. For example, the transmitter device may multiplex the codewords or the portions of codewords associated with each UE of UE 1, UE 2, and the other UEs after the data associated with UE 1, UE 2, and the other UEs is encoded. In some aspects, the transmitter device may provide particular codewords or portions of codewords, of the coded data for a UE, as the coded first part. In some aspects, the transmitter device may explicitly or implicitly provide information about how the multiplexing is performed (e.g., the fraction of bits to be extracted from at least one first layer for each UE), and/or about which codeword each first layer is mapped with.

As shown by reference number 510, the transmitter device may perform modulation, precoding, and power allocation of the second layers for UE 1, the second layers for UE 2, and the first layers for UE 1, UE 2, and/or the other UEs. These operations may be similar to the modulation, precoding, and amplification for second layers and first layers described in connection with FIG. 3, above. For example, the transmitter device may transmit to the UE information to identify constellations to be used for the second layers and/or the first layers.

As indicated above, FIG. 5 is provided as an example. Other examples may differ from what is described with respect to FIG. 5.

Figure 6:
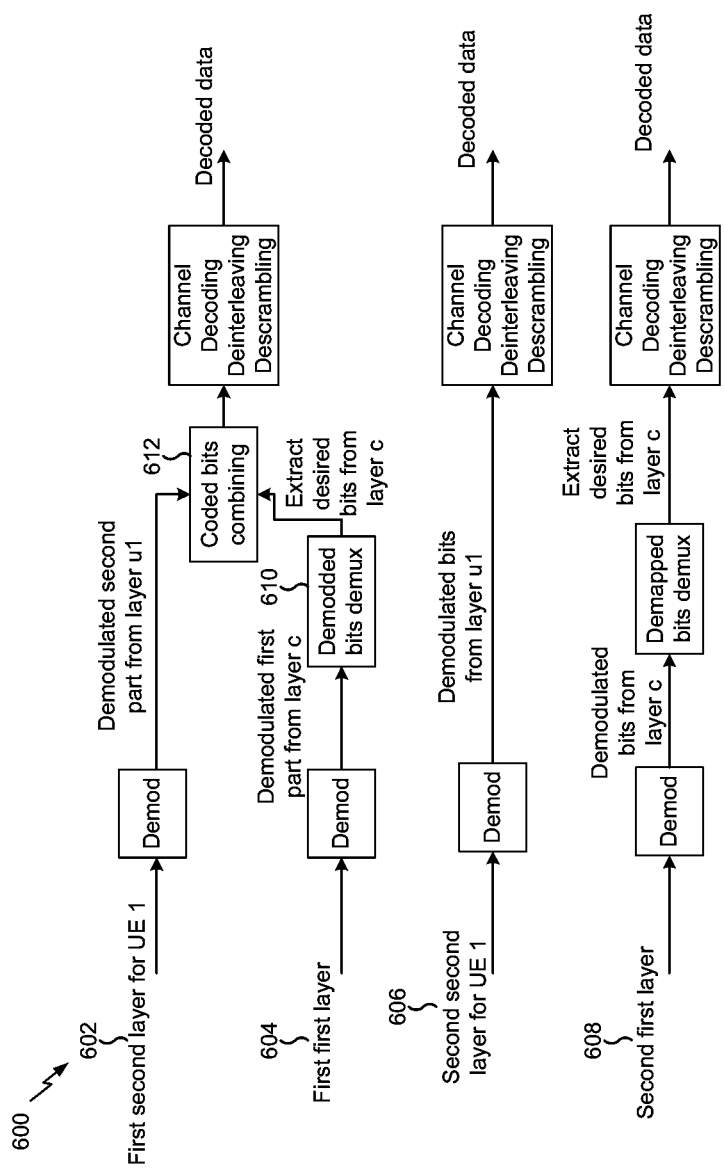
FIG. 6 is a diagram illustrating an example of a receiver device for receiving communications using at least one first layer and/or at least one second layer that are formed using coded bits, in accordance with various aspects of the present disclosure.

FIG. 6 is a diagram illustrating an example 600 of a receiver device for receiving communications using at least one second layer and/or at least one first layer that are formed using coded bits, in accordance with various aspects of the present disclosure. In some aspects, the operations described in FIG. 6 may be performed by a receiver device (e.g., BS 110, UE 120, and/or the like). In FIG. 6, the receiver device is referred to as UE 1.

As shown in FIG. 6, and by reference number 602, the receiver device may receive a first second layer for the receiver device (e.g., UE 1). As shown by reference number 604, the receiver device may receive a first first layer. For the purpose of FIG. 6, assume that a particular codeword is mapped to the first second layer and the first first layer. For example, a first portion of the particular codeword may be mapped to the first second layer, and a second portion of the particular codeword may be mapped to the first first layer.

Furthermore, the second portion of the particular codeword may be multiplexed with portions of codewords associated with other receiver devices in the first layer. A description of demultiplexing, combining, and decoding the first second layer and the first first layer (in connection with reference numbers 610 and 612) follows the description of reference numbers 606 and 608, below.

As shown by reference number 606, the receiver device may receive a second second layer for the receiver device. The second second layer may not be associated with a codeword that is also mapped to a first layer (e.g., the second second layer may be associated with a codeword that is mapped only to a second layer). Therefore, the receiver device may demodulate, decode, deinterleave, and descramble the second second layer to obtain a second part for the receiver device, as described in more detail elsewhere herein.

As shown by reference number 608, the receiver device may receive a second first layer. In some aspects, the second first layer may be a different first layer than the first first layer. In some aspects, the second first layer and the first first layer may be the same first layer. In other words, a particular first layer may include one or more codewords that are also mapped to the first second layer and one or more codewords that are not mapped to the first second layer. As further shown, the receiver device may demodulate, demultiplex, decode, deinterleave, and descramble the second first layer, as described in more detail elsewhere herein, to obtain first part associated with the receiver device. In some aspects, in the demultiplexing operation, the receiver device may extract the desired data based at least in part on information used for identifying which fraction of data is to be extracted from the second first layer.

As shown by reference number 610, the receiver device may demodulate the first first layer (e.g., based at least in part on information identifying a constellation associated with the first first layer), and may demultiplex the demodulated data of the first first layer. For example, the receiver device may demultiplex the demodulated data to obtain the second portion of the particular codeword that is mapped to the first first layer, as described above. In some aspects, the receiver device may demultiplex the demodulated data based at least in part on information identifying a mapping of codewords to layers that indicates that the second portion of the particular codeword is mapped to the first first layer. In some aspects, the receiver device may extract the desired demodulated data based at least in part on information identifying which fraction of data is to be extracted from the first first layer. As further shown, by demultiplexing the first first layer, the receiver device may obtain desired data (e.g., desired bits) from the first first layer (e.g., layer c).

As shown by reference number 612, the receiver device may combine the demodulated second part from the second layer (e.g., layer u1) and the desired bits from the first first layer (e.g., layer c). For example, the receiver device may combine the first portion of the particular codeword and the second portion of the particular codeword to form the particular codeword. As further shown, the receiver device may perform channel decoding, deinterleaving, and descrambling to obtain decoded data. In this way, the receiver device may receive data over a combination of the first second layer and the first first layer, which improves versatility of encoding of data for the receiver device and which may improve throughput of the receiver device.

In some aspects, there may be a third first layer. After extracting desired demodulated data from the third first layer, the desired demodulated data may be a third portion of a particular codeword. The receiver device may combine the third portion with data from a first second layer and a first first layer.

As indicated above, FIG. 6 is provided as an example. Other examples may differ from what is described with respect to FIG. 6.

Figure 7:
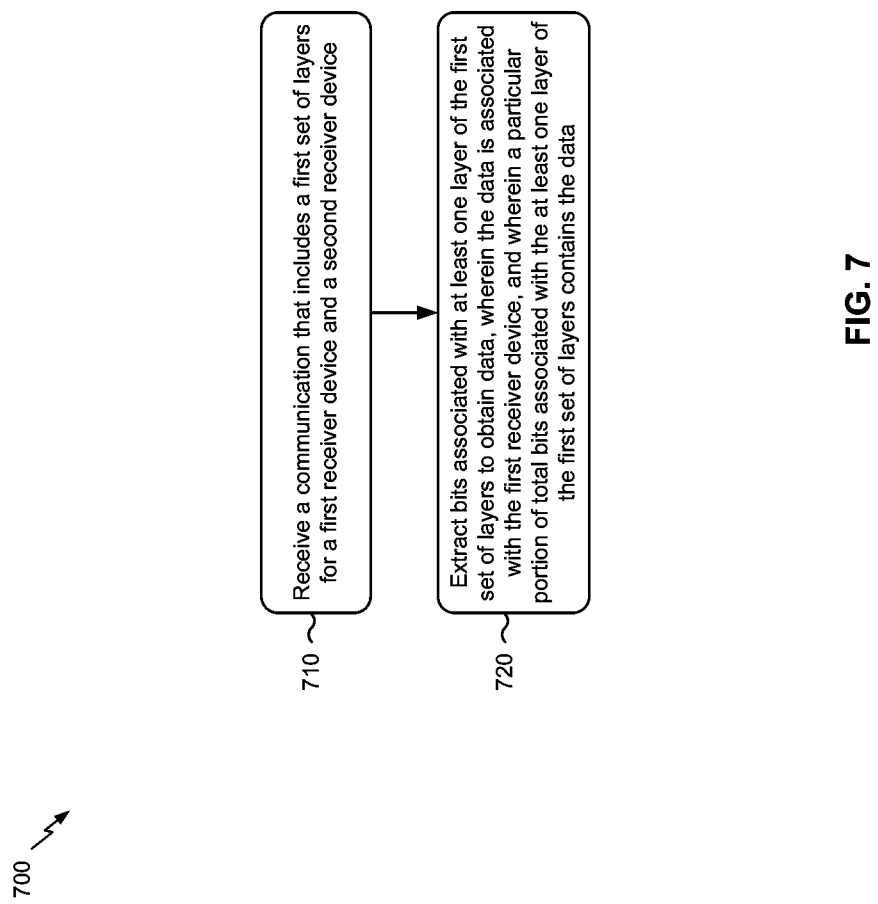
FIG. 7 is a diagram illustrating an example process performed, for example, by a receiver device, in accordance with various aspects of the present disclosure.

FIG. 7 is a diagram illustrating an example process 700 performed, for example, by a receiver device, in accordance with various aspects of the present disclosure. Example process 700 is an example where a first receiver device (e.g., BS 110, UE 120, and/or the like) performs a communication based at least in part on rate splitting using second layers and first layers.

As shown in FIG. 7, in some aspects, process 700 may include receiving a communication that includes a first set of layers for the first receiver device and a second receiver device (block 710). For example, the first receiver device (e.g., using antenna 252, DEMOD 254, MIMO detector 256, receive processor 258, controller/processor 280, antenna 234, DEMOD 232, MIMO detector 236, receive processor 238, controller/processor 240, and/or the like) may receive a communication. The communication may include a first set of layers (e.g., at least one first layer) for the first receiver device and a second receiver device other than the first receiver device. In some aspects, the communication may include a second set of layers (e.g., at least one second layer) for the first receiver device and/or at least one second layer for the second receiver device.

As shown in FIG. 7, in some aspects, process 700 may include extracting bits associated with at least one layer, of the first set of layers, to obtain data, wherein the data is associated with the first receiver device, and wherein a particular portion of total bits associated with the at least one layer, of the first set of layers, contains the data (block 720). For example, the first receiver device (e.g., using controller/processor 240, controller/processor 280, and/or the like) may extract bits associated with at least one layer of the first set of layers. The first receiver device may extract the bits to obtain data associated with the receiver device. A particular portion of total bits associated with the at least one layer of the first set of layers may contain the data. For example, another portion of at least one layer of the first set of layers, other than the particular portion associated with the first receiver device, may contain data associated with the second receiver device.

Process 700 may include additional aspects, such as any single aspect or any combination of aspects described below and/or in connection with one or more other processes described elsewhere herein.

In a first aspect, the first receiver device may receive a second set of layers associated with the first receiver device; and obtain other data associated with the first receiver device from at least one layer of the second set of layers. In a second aspect, alone or in combination with the first aspect, the extraction is performed with regard to decoded information bits, wherein the decoded information bits are obtained by performing channel decoding and demodulation with regard to constellation symbols associated with the at least one layer of the first set of layers. In a third aspect, alone or in combination with the first aspect, the extraction is performed with regard to demodulated undecoded bits, wherein the demodulated undecoded bits are obtained by performing demodulation with regard to constellation symbols associated with the at least one layer of the first set of layers, and wherein the extracted bits are channel decoded into information bits including the data. In a fourth aspect, alone or in combination with the third aspect, the extracted bits are combined with demodulated undecoded bits associated with the at least one layer of the second set of layers to form combined bits, and the combined bits are channel decoded into the information bits including the data.

In a fifth aspect, alone or in combination with any one or more of the first through fourth aspects, the first receiver device may receive information indicating whether the extracting is to be performed with regard to decoded bits or demodulated undecoded bits; and selectively perform the extracting after channel decoding or before channel decoding based at least in part on the information. In a sixth aspect, alone or in combination with any one or more of the first through fifth aspects, the first receiver device may receive information indicating a mapping of codewords or code blocks to at least one layer of the first set of layers and the second set of layers. In a seventh aspect, alone or in combination with any one or more of the first through sixth aspects, a particular portion to be extracted from the at least one layer of the first set of layers is identified based at least in part on the information indicating the mapping. In an eighth aspect, alone or in combination with any one or more of the first through seventh aspects, the first receiver device may receive information identifying one or more modulation constellations to be used for at least one layer of the first set of layers and the second set of layers; and demodulate constellation symbols associated with the at least one layer of the first set of layers and the second set of layers based at least in part on the information identifying the one or more modulation constellations.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
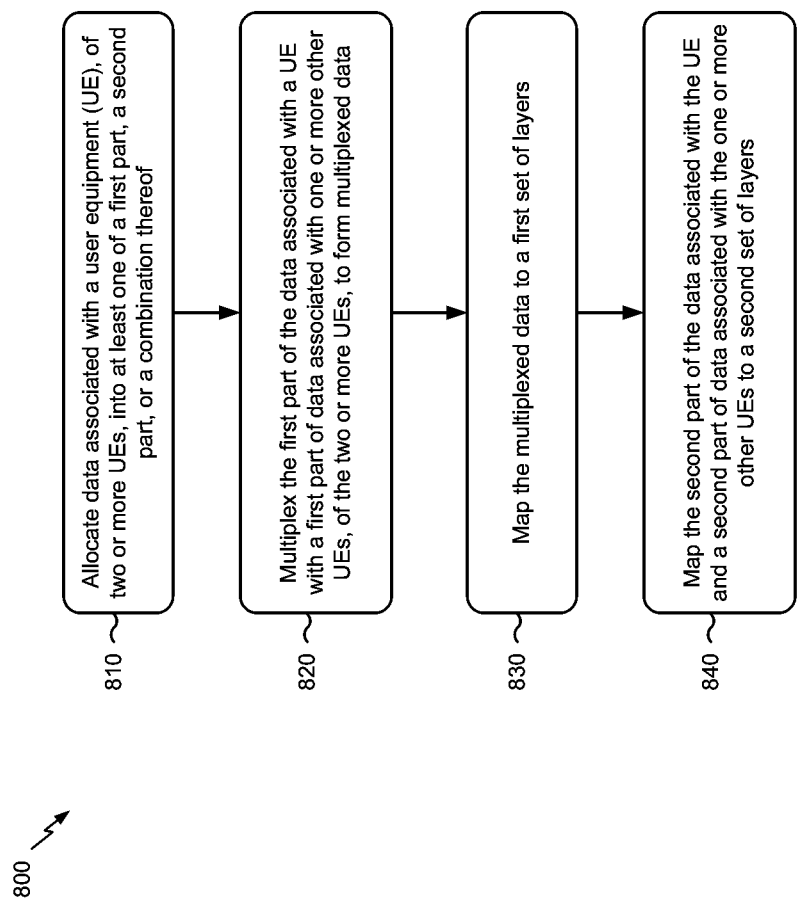
FIG. 8 is a diagram illustrating an example process performed, for example, by a transmitter device, in accordance with various aspects of the present disclosure.

FIG. 8 is a diagram illustrating an example process 800 performed, for example, by a transmitter device, in accordance with various aspects of the present disclosure. Example process 800 is an example where a transmitter device (e.g., BS 110, UE 120, and/or the like) performs communication based at least in part on rate splitting using second layers and first layers.

As shown in FIG. 8, in some aspects, process 800 may include allocating data associated with a UE, of two or more UEs, into at least one of a first part, a second part, or a combination thereof (block 810). For example, the transmitter device (e.g., using controller/processor 240, controller/processor 280, and/or the like) may allocate data associated with a UE, of two or more UEs, into at least one of a first part, a second part, or a combination thereof.

As shown in FIG. 8, in some aspects, process 800 may include multiplexing the first part of the data associated with the UE with a first part of data associated with one or more other UEs, of the two or more UEs, to form multiplexed data (block 820). For example, the transmitter device (e.g., using controller/processor 240, controller/processor 280, and/or the like) may multiplex the first part of the data associated with the UE (e.g., the first part) with a first part of data associated with one or more other UEs (e.g., first parts of the data associated with the one or more other UEs) to form multiplexed data.

As shown in FIG. 8, in some aspects, process 800 may include mapping the multiplexed data to a first set of layers (block 830). For example, the transmitter device (e.g., using controller/processor 240, controller/processor 280, and/or the like) may map the multiplexed data to a first set of layers. In some aspects, the first set of layers may include one or more first layers.

As shown in FIG. 8, in some aspects, process 800 may include mapping the second part of the data associated with the UE and a second part of data associated with the one or more other UEs to a second set of layers (block 840). For example, the transmitter device (e.g., using controller/processor 240, controller/processor 280, and/or the like) may map a second part of the data associated with the UE (e.g., a second part of the data) and a second part of data associated with the one or more UEs to a second set of layers (e.g., one or more second layers).

Process 800 may include additional aspects, such as any single aspect or any combination of aspects described below and/or in connection with one or more other processes described elsewhere herein.

In a first aspect, the splitting further comprises splitting an uncoded bit sequence into at least one of the first part, the second part, or the combination thereof, wherein the first part is a first part bit sequence and the second part is a second part bit sequence; the multiplexing further comprises multiplexing the first part bit sequence of the UE with a first part bit sequence of the one or more other UEs to form a composite bit sequence, wherein the composite bit sequence is the multiplexed data; the method further comprises generating a coded bit sequence using the composite bit sequence; and the mapping the multiplexed data to the first set of layers further comprises mapping the coded bit sequence to the first set of layers.

In a second aspect, alone or in combination with the first aspect, the uncoded bit sequence includes at least one of an uncoded code block, an uncoded codeword, or an uncoded transport block. In a third aspect, alone or in combination with any one or more of the first and second aspects, the transmitter device may provide information for the one or more UEs, indicating a fraction of bits to be extracted from the composite bit sequence.

In a fourth aspect, the splitting further comprises splitting a coded code block or a coded codeword into at least one of the first part, the second part, or the combination thereof, wherein the data includes the coded code block or the coded codeword of the UE; the multiplexing comprises multiplexing the first part of the coded code block or the coded codeword of the UE with a first part of a coded code block or a coded codeword of one or more other UEs, to form a composite coded code block or a composite coded codeword, wherein the multiplexed data includes the composite coded code block or the composite coded codeword; and the mapping the multiplexed data to the first set of layers comprises mapping the composite coded code block or the composite coded codeword to the first set of layers. In a fifth aspect, alone or in combination with the fourth aspect, the transmitter device may provide information for the one or more UEs, indicating a fraction of bits to be extracted from the composite coded code block or the composite coded codeword. In a sixth aspect, alone or in combination with the fourth aspect and/or the fifth aspect, the transmitter device may provide information indicating whether the multiplexing or the splitting is applied to at least one of uncoded codeblocks or codewords, transport blocks, or coded codeblocks or codewords.

In a seventh aspect, alone or in combination with any one or more of the first through sixth aspects, the transmitter device may provide information indicating a mapping of the data associated with the one or more UEs with regard to at least one of the first set of layers or the second set of layers.

In an eighth aspect, alone or in combination with any one or more of the first through seventh aspects, the transmitter device may configure one or more modulation constellations and/or coding schemes to be used for at least one of the first set of layers or the second set of layers. In a ninth seventh aspect, alone or in combination with any one or more of the first through eighth aspects, the transmitter device may provide information indicating the first set of layers, wherein the information indicates at least one of a number of layers in the first set of layers, or which layers, of all layers of the first set of layers and the second set of layers, belong to the first set of layers. In a tenth aspect, alone or in combination with any one or more of the first through ninth aspects, each UE, of the two or more UEs, is associated with a respective one or more layers of the second set of layers. In an eleventh aspect, alone or in combination with any one or more of the first through tenth aspects, each UE, of the two or more UEs, is associated with a different one or more layers of the second set of layers.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter device, comprising:
    allocating data associated with a user equipment (UE) into at least a first part of the data associated with the UE and a second part of the data associated with the UE;
    multiplexing the first part of the data associated with the UE with a first part of data associated with one or more other UEs to form multiplexed data;
    mapping the multiplexed data to a first set of layers; and
    mapping the second part of the data associated with the UE and a second part of the data associated with the one or more other UEs to a second set of layers.

2. The method of claim 1, wherein the allocating further comprises allocating an uncoded bit sequence into at least one of the first part of the data associated with the UE or the second part of the data associated with the UE, wherein the first part of the data associated with the UE is a first part bit sequence and the second part of the data associated with the UE is a second part bit sequence,
    wherein the multiplexing further comprises multiplexing the first part bit sequence of the UE with a first part bit sequence of the one or more other UEs to form a composite bit sequence, wherein the composite bit sequence is the multiplexed data,
    wherein the method further comprises generating a coded bit sequence using the composite bit sequence, and
    wherein the mapping the multiplexed data to the first set of layers further comprises mapping the coded bit sequence to the first set of layers.

3. The method of claim 2, wherein the uncoded bit sequence includes at least one of an uncoded code block, an uncoded codeword, or an uncoded transport block.

4. The method of claim 2, further comprising:
    providing information for the UE or the one or more other UEs indicating respective fractions of bits to be extracted from the composite bit sequence.

5. The method of claim 1,
    wherein the allocating further comprises allocating a coded code block or a coded codeword of the UE into at least one of a first part of the coded code block or the coded codeword of the UE, a second part of the coded code block or the coded codeword of the UE, or a combination thereof, wherein the data includes the coded code block or the coded codeword of the UE,
    wherein the multiplexing further comprises multiplexing the first part of the coded code block or the coded codeword of the UE with a first part of a coded code block or a coded codeword of the one or more other UEs to form a composite coded code block or a composite coded codeword,
    wherein the multiplexed data includes the composite coded code block or the composite coded codeword, and
    wherein the mapping the multiplexed data to the first set of layers comprises mapping the composite coded code block or the composite coded codeword to the first set of layers.

6. The method of claim 5, further comprising:
    providing information for the UE or the one or more other UEs indicating respective fractions of bits to be extracted from the composite coded code block or the composite coded codeword.

7. The method of claim 1, further comprising:
    providing information indicating whether the multiplexing or the allocating is to be applied to at least one of:
        uncoded codeblocks or codewords,
        transport blocks, or
        coded codeblocks or codewords.

8. The method of claim 1, further comprising:
    providing information indicating a mapping of the data associated with the one or more other UEs with regard to at least one of the first set of layers or the second set of layers.

9. The method of claim 1, further comprising:
    configuring one or more modulation constellations or coding schemes to be used for at least one of the first set of layers or the second set of layers.

10. The method of claim 1, further comprising:
    providing information associated with the first set of layers, wherein the information indicates at least one of:
        a number of layers in the first set of layers, or
        which layers, of the first set of layers and the second set of layers, belong to the first set of layers.

11. The method of claim 1, wherein each UE, of the UE and the one or more other UEs, is associated with a respective one or more layers of the second set of layers.

12. The method of claim 1, wherein each UE, of the UE and the one or more other UEs, is associated with a different one or more layers of the second set of layers.

13. A method of wireless communication performed by a first receiver device, comprising:
    receiving a communication that includes a first set of layers for the first receiver device and a second receiver device, the first set of layers comprising data associated with the first receiver device; and
    extracting bits associated with at least one layer, of the first set of layers, to obtain the data associated with the first receiver device, and wherein a particular portion of total bits associated with the at least one layer contains the data.

14. The method of claim 13, further comprising:
    receiving a second set of layers associated with the first receiver device; and
    extracting other data associated with the first receiver device from at least one layer of the second set of layers.

15. The method of claim 14, wherein the extraction is performed with regard to demodulated undecoded bits, wherein the demodulated undecoded bits are obtained by performing demodulation with regard to constellation symbols associated with the at least one layer of the first set of layers, and wherein the extracted bits are channel decoded into information bits including the data.

16. The method of claim 15, wherein the extracted bits are combined with demodulated undecoded bits associated with the at least one layer, of the second set of layers, to form combined bits, and wherein the combined bits are channel decoded into the information bits including the data.

17. The method of claim 14, further comprising:
receiving information indicating a mapping of codewords or code blocks to at least one layer of the first set of layers and the second set of layers.

18. The method of claim 17, wherein a particular portion to be extracted from the at least one layer of the first set of layers is identified based at least in part on the information indicating the mapping.

19. The method of claim 14, further comprising:
receiving information identifying one or more modulation constellations to be used for at least one layer of the first set of layers and the second set of layers; and
demodulating constellation symbols associated with the at least one layer of the first set of layers and the second set of layers based at least in part on the information identifying the one or more modulation constellations.

20. The method of claim 13, wherein the extraction is performed with regard to decoded information bits, wherein the decoded information bits are obtained by performing channel decoding and demodulation with regard to constellation symbols associated with the at least one layer.

21. The method of claim 13, further comprising:
receiving information indicating whether the extracting is to be performed with regard to decoded bits or demodulated undecoded bits; and
selectively performing the extracting after channel decoding or before channel decoding based at least in part on the information.

22. A transmitter device for wireless communication, comprising:
memory; and
one or more processors coupled to the memory, the one or more processors configured to:
allocate data associated with a user equipment (UE) into at least a first part of the data associated with the UE and a second part, of the data associated with the UE;
multiplex the first part of the data associated with the UE with a first part of data associated with one or more other UEs to form multiplexed data;
map the multiplexed data to a first set of layers; and
map the second part of the data associated with the UE and a second part of data associated with the one or more other UEs to a second set of layers.

23. The transmitter device of claim 22, wherein the one or more processors, when allocating the data, are further to allocate an uncoded bit sequence into at least one of a first part of the coded code block or the coded codeword of the UE, a second part of the coded code block or the coded codeword of the UE, or a combination thereof, wherein the first part is a first part bit sequence and the second part is a second part bit sequence,
wherein the one or more processors, when multiplexing the first part of the data associated with the UE with a first part of data associated with one or more other UEs, are further to multiplex the first part bit sequence of the UE with a first part bit sequence of the one or more other UEs to form a composite bit sequence, wherein the composite bit sequence is the multiplexed data,
wherein the one or more processors are further to generate a coded bit sequence using the composite bit sequence, and
wherein the one or more processors, when mapping the multiplexed data to the first set of layers, are further to map the coded bit sequence to the first set of layers.

24. The transmitter device of claim 23, wherein the uncoded bit sequence includes at least one of an uncoded code block, an uncoded codeword, or an uncoded transport block.

25. The transmitter device of claim 23, wherein the one or more processors are further to:
provide information for the UE and the one or more other UEs indicating respective fractions of bits to be extracted from the composite bit sequence.

26. A first receiver device for wireless communication, comprising:
memory; and
one or more processors coupled to the memory, the one or more processors configured to:
receive a communication that includes a first set of layers for the first receiver device and a second receiver device, the first set of layers comprising data associated with the first receiver device; and
extract bits associated with at least one layer, of the first set of layers, to obtain the data, associated with the first receiver device, and wherein a particular portion of total bits associated with the at least one layer of the first set of layers contains the data.

27. The first receiver device of claim 26, wherein the one or more processors are further to:
receive a second set of layers associated with the first receiver device; and
extract other data associated with the first receiver device from at least one layer of the second set of layers.

28. The first receiver device of claim 27, wherein the extraction is performed with regard to demodulated undecoded bits, wherein the demodulated undecoded bits are obtained by performing demodulation with regard to constellation symbols associated with the at least one layer of the first set of layers, and wherein the extracted bits are channel decoded into information bits including the data.

29. The first receiver device of claim 28, wherein the extracted bits are combined with demodulated undecoded bits associated with the at least one layer, of the second set of layers, to form combined bits, and wherein the combined bits are channel decoded into the information bits including the data.

30. The first receiver device of claim 27, wherein the one or more processors are further to:
receive information indicating a mapping of codewords or code blocks to at least one layer of the first set of layers and the second set of layers.

* * * * *